Figures 1, 2:
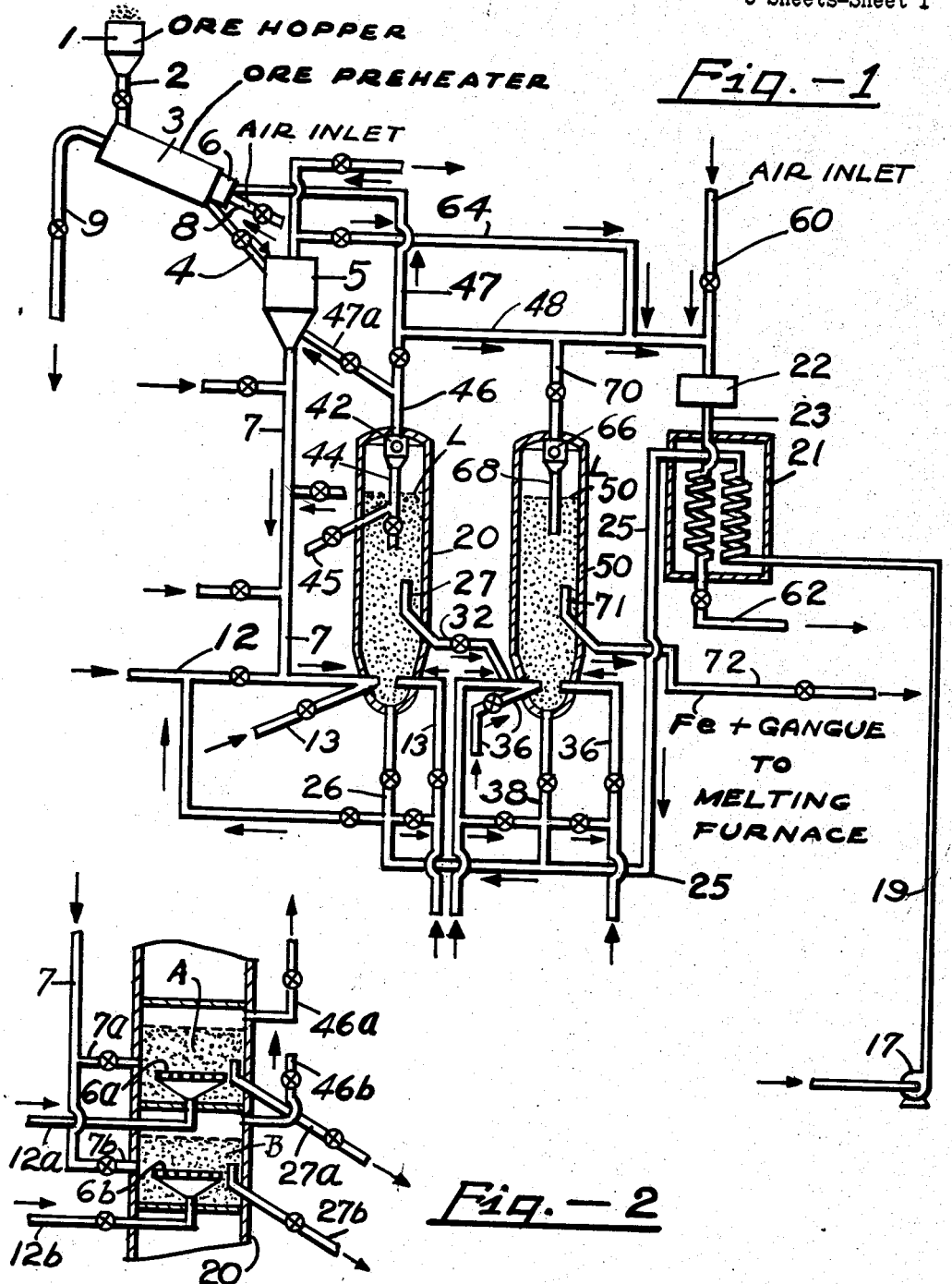

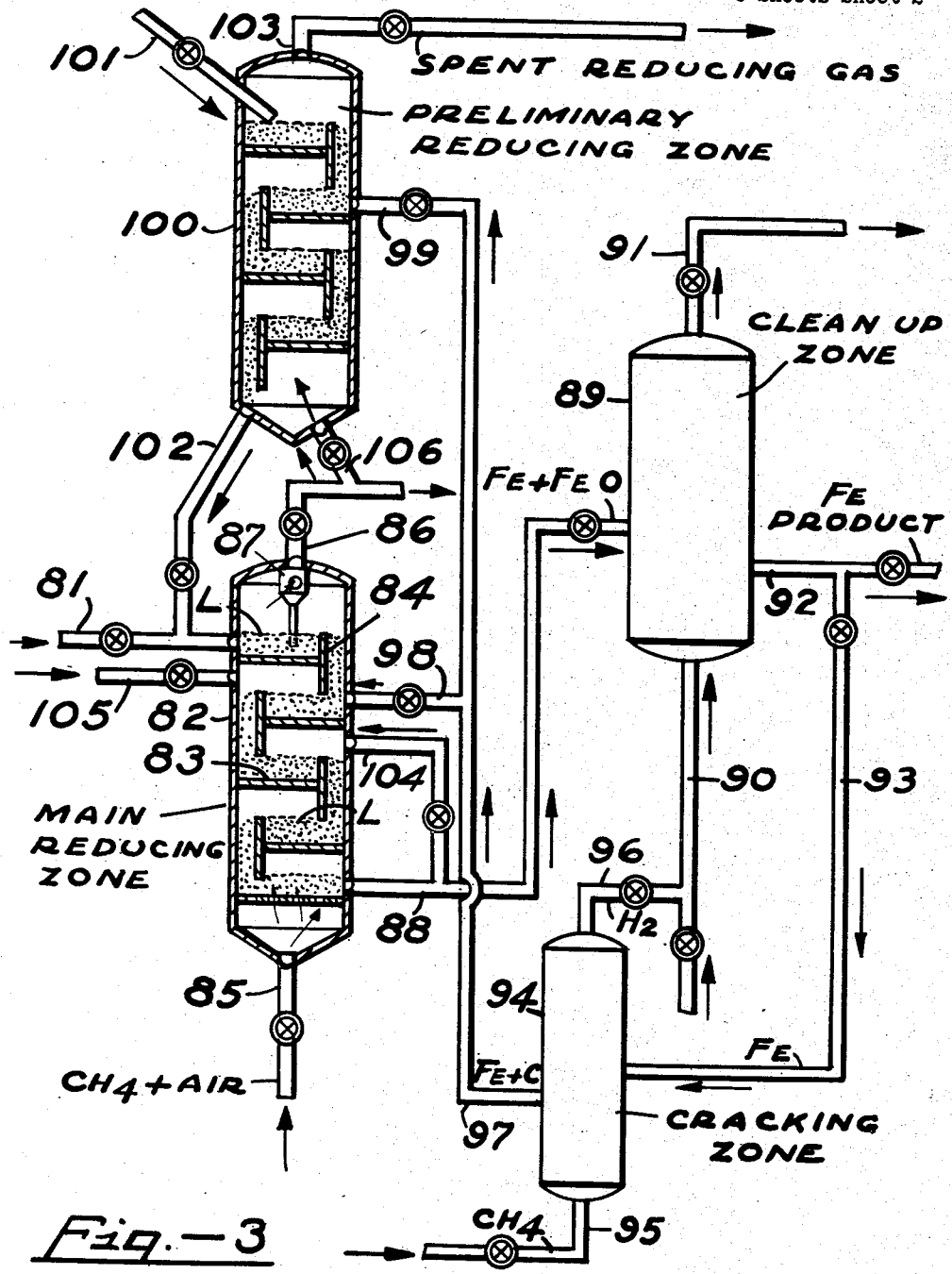

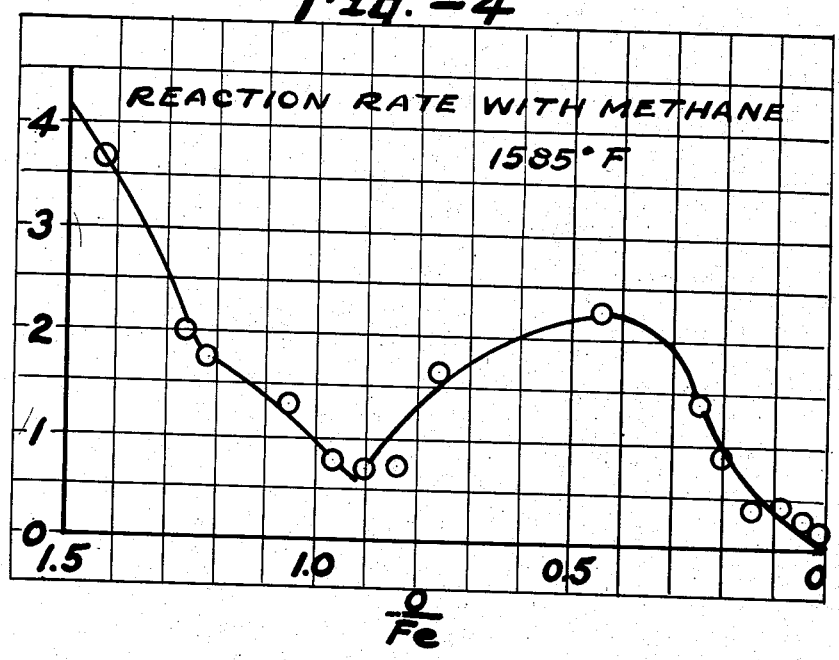
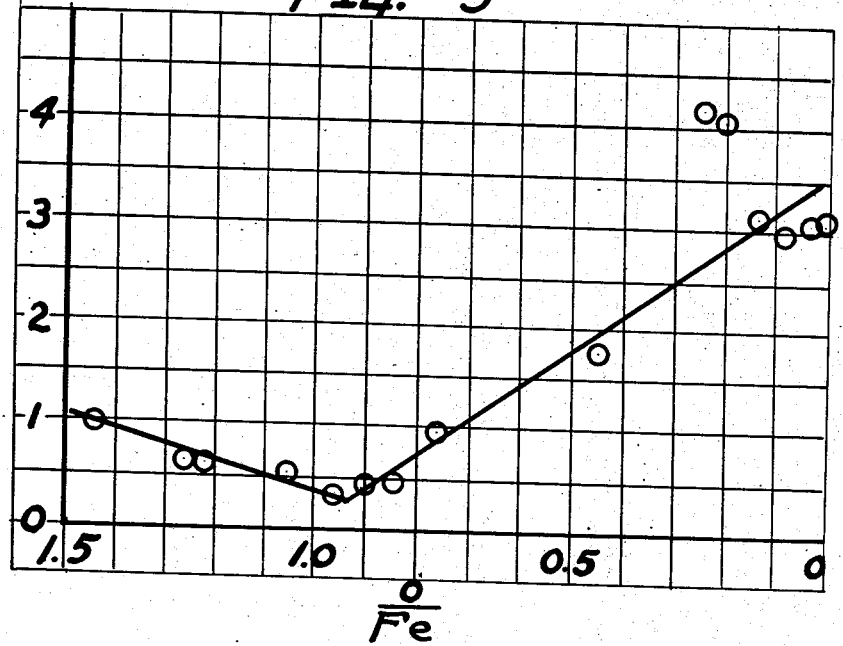

2,711,368

PROCESS FOR REDUCING OXIDIC IRON ORE

Warren K. Lewis, Newton, Mass., assignor to Esso Research and Engineering Company, a corporation of Delaware Application December 1, 1949, Serial No. 130,510

18 Claims. (Cl. 75—26)

This application is a continuation-in-part of Serial Number 41,603, filed July 30, 1948, now abandoned.

The present invention relates to an improved metallurgical process. More specifically, the invention is concerned with the production of metals of the iron type such as iron, nickel, etc. from their oxides, more particularly their oxidic ores by a reduction with gaseous hydrocarbons such as methane, ethane, natural gas, refinery gases or the like.

Heretofore, many efforts have been made to utilize gaseous hydrocarbons, particularly natural gas as a reducing agent for the recovery of metals, particularly iron, from their oxidic ores. Natural gas is an abundant and inexpensive raw material. However, its direct use as a reducing agent for metallic ores such as oxidic ores has encountered serious difficulties which made processes of this type unattractive in commercial operation.

Probably the most important single reason for this situation must be found in the particularly poor thermal characteristics of ordinary hydrocarbons as the reducing agent for oxidic iron ore or the like. The prevailing reduction reactions involving such hydrocarbons are strongly endothermic and their rates become appreciable only at relatively high temperatures. In order to supply the heat required by these reactions and to maintain temperatures of this high level in the reduction zone, by preheating either the gas feed or the ore or both, prohibitively high preheating temperatures are required. If this heat is to be supplied from an external source through the walls of the reduction zone, temperature gradients are undesirably high. If it is attempted to generate the heat within the reduction zone itself by a combustion of fuels, the reactions must be carefully so controlled that the ratio of $CO_2:CO$ in the gas phase stays below the equilibrium value, at the temperature employed, of the oxidation-reduction reactions of iron oxides in the presence of carbon oxides. When employing the ore in powdered form particularly when using the so-called fluid solids technique, high temperatures above about 950° C. must be avoided because such high temperatures have been found to be conducive to agglomeration of particles, probably as a result of plasticization of the solids, particularly the reduced iron itself. It follows that the process requires the supply of a large amount of heat and simultaneously a careful control of temperature within relatively narrow limits.

It has been suggested to supply the heat required in the reduction zone by the combustion of substantially pure hydrogen in contact with the ore. However, pure hydrogen is expensive which affects adversely the economics of this type of operation. When attempting to generate sufficient heat by a partial combustion of $CH_4$ in contact with the ore and/or reduced metal, other considerable difficulties arise. In the first place the oxidation of methane merely to CO has only a rather insignificant positive heat effect so that when substantial amounts of heat are required the methane consumption is excessive. Far more heat may be produced by burning $CH_4$ all the way to $CO_2$ and $H_2O$. However, as shown above, only a limited $CO_2$ concentration may be tolerated in the reduction zone, if reoxidation of metal is to be avoided. It is extremely difficult, therefore, to reconcile the requirements of efficient heat generation and reduction when using methane both as the reducing and combustion-supporting agent. Furthermore, when methane is passed through a bed of metal ore at reducing conditions, the ore first contacted by the methane will soon be reduced to metal. As a result, methane is cracked at the high prevailing temperatures under the catalytic influence of reduced metal to consume heat and to form large amounts of carbon which are deposited on the metal, and most of which must be removed prior to further utilization of the metal. Moreover, the degree to which this reaction proceeds when allowed to occur is difficult to control. For these reasons natural gas or its equivalents have not been used directly for the reduction of ores in commercial operation. As far as I am aware, all practical attempts to utilize these gases have been directed toward the cracking, incomplete combustion or reformation of the hydrocarbon gases in a separate reaction zone and the use of the combustion or cracking products, i. e., CO, $H_2$ and/or C as the reducing agents in a two-stage procedure.

The present invention is chiefly concerned with a practical solution of the problems mentioned above.

It is, therefore, the principal object of the present invention to provide improved means for reducing metal oxides with hydrocarbon gases.

A more specific object of the invention is to provide practical and economic means for the direct reduction of solid metal oxides with hydrocarbon gases such as natural gas or its equivalents.

A still more specific object of the invention is to provide improved means for the direct reduction of iron oxides, particularly oxidic iron ores, with hydrocarbon gases such as natural gas or its equivalents.

Other objects and advantages will appear from the following detailed description read with reference to the accompanying drawings.

In accordance with the present invention, these objects may be accomplished by passing an excess of a hydrocarbon gas at a reduction temperature through a dense turbulent mass of the finely divided metal oxide fluidized by upwardly flowing gases to resemble a boiling liquid while generating at least a substantial portion of the heat to be supplied to the reduction reaction by a controlled combustion of gaseous hydrocarbons with an oxidizing gas such as air and/or oxygen within the reduction zone itself and controlling the reduction process in such a manner that just sufficient metal oxide remains unreduced to minimize the deposition of excessive amounts of carbon by cracking of hydrocarbon gas in the reducing zone. The relatively small proportions of metal oxide of, say, about 5 to 30% remaining unreduced (in the form of FeO in the case of iron) may then be completely reduced to metal in a second reducing step with relatively small amounts of reducing gas such as methane but preferably hydrogen or a mixture of hydrogen and CO. The upper limit of the amount of unreduced iron oxide is not critical, however, as to the lower limit, at least 5% of the oxide should remain unreduced. The exact amount of unreduced oxide will depend on the operating conditions, particularly on the air requirement. In practical operation it lies within the limits of 5 to 30%. It is essential for the process of the invention that the ratio of oxygen to hydrocarbon gas available in the reduction zone is so controlled that the ratio of $CO_2:CO$ in the exit gas will remain below that at which oxidation of the metal becomes prevalent, while at the same time this ratio must be so adjusted as to maintain an oxidizing potential adequately high substantially to reduce carbon deposition by cracking of hydrocarbon gas.

Experimental data have demonstrated that when in the course of reduction of $Fe_2O_3$ ore with methane the ore reaches the FeO stage (ratio of O/Fe=1.0), reaction rate with methane falls to an extremely low level but is far higher on both sides of this oxygen to iron ratio, particularly on the iron side, i. e., when the ratio of oxygen to iron is less than 1.0, preferably around 0.3. This relationship is shown graphically in Figure 5. This fact makes possible rapid and successive reduction of oxidic ores with methane provided the proper technique is employed. In accordance with this invention, in the reduction of oxidic ores with methane the oxide should be introduced into a body of well-mixed solids containing metal (iron), e. g., metal from previously reduced oxide, and maintaining a substantial fraction of oxides in the solids.

In plots of reaction rates of $Fe_2O_3$ and methane versus O/Fe, breaks were found near O/Fe ratios of 1.33 and 1.0. Particularly at the latter value of the ratio, the break amounts to a complete reversal of rate. These breaks were taken as meaning that the definite compounds $Fe_2O_3$, $Fe_3O_4$ and FeO decomposed methane by definite and different mechanisms. This phenomenon is illustrated in Figure 4.

At high atomic ratios of oxygen to iron (1.4–1.5) methane was oxidized rapidly to predominantly carbon dioxide and water vapor. As this ratio of O/Fe decreases, both methane decomposition rate and the ore reduction rate fell sharply, reaching a nadir at O/Fe of substantially unity. Carbon monoxide and hydrogen in the methane decomposition products increased over this range at the expense of carbon dioxide and steam.

As the ratio of O/Fe decreases below unity, both the methane decomposition and oxide reduction rates increased almost as fast as they had previously fallen. Carbon monoxide and hydrogen continued to increase. At O/Fe of roughly 0.3 (80% of $O_2$ removed from $Fe_2O_3$), carbon dioxide and water vapor practically disappeared from the outlet gas and rapid carbon deposition began. The reduction rate of the original $Fe_2O_3$ began to fall off, but the methane decomposition continued to rise, reaching its maximum value when reduction was complete. This maximum value was about thirty times the minimum value at O/Fe of unity.

In the preferred operation, therefore, reduction of iron ore (an oxide of iron) is effected by the use of natural gas as a reducing agent in a single operation conducted at a suitable temperature, not over 950° C., in which the solids in the reduction zone are kept well mixed in a state of reduction such that they contain a substantial fraction, namely 70–95% of the total iron present as metal to give a product containing not less than 5% of the total iron in it as iron oxide (FeO). The operation may be either batch or continuous.

One method of operation involves the use of a counterflow column (e. g., a packed column properly operated), in which powdered metal is picked up from a point near the bottom of the column and recycled to an upper point in the column in quantities sufficient so that, after mixing at the point of injection of the recycled powder, followed by reaction, there is still residual metal in the downflow powdered solids at that point. While the recycled metal may be withdrawn from the powder stream leaving the bottom of the column, it is usually preferable to withdraw it at a point somewhat above this. This recycled powder may be introduced into the ore stream entering the top of the column, but it is usually preferable to introduce it at a somewhat lower point to reduce gas consumption. However, this last step should never be done if the iron in the ore fed is divalent, because in that event metal in the powder is essential to get a reasonable reduction rate. Moreover, even if the ore is trivalent iron, the top of the column should be so operated that reduction above the point of recycle does not get too close to the FeO state, again to avoid low reduction rates in that part of the column.

Usually, at no point in the column should any considerable carbon deposition be allowed to occur. As long as the reduction to metal is incomplete, so that the powder has a reasonable ratio of O/Fe, reduction can be carried out with methane without serious carbon deposition. If, however, completion of reduction is attempted with methane as the reducing agent, carbon deposition will become extensive, in the later stages. For this reason we prefer to introduce the major supply of reducing methane into the column just below the plate from which the recycled powder is withdrawn and to complete the reduction of the iron oxide in the remaining powder withdrawn from that plate in a separate stage. This stage may be a separate unit or it may be a lower section of the main column. A series of alternatives for completion of reduction are available. One may use hydrogen, CO, or a mixture of the two. Such a mixture may be produced by reforming methane with steam in a separate operation, or by oxidizing methane by the technique of the Reed application Serial Number 32,733 filed June 12, 1948 and owned by applicant's assignee, now abandoned. Alternatively, one can use methane, but prevent carbon deposition by admitting it with suitable amounts of steam and/or $CO_2$. In this event the metallic iron serves as a catalyst for the reforming reaction, the products of which complete the reduction. The gases from this final reduction stage can usually best be allowed to mix with those entering the major reduction zone.

It has been found that the ideal heat transfer characteristics and mixing speed and the resulting perfect uniformity of solids composition, gas distribution and all other conditions throughout a dense fluidized mass of finely divided ore permit the successful maintenance of the critical conditions of heat generation, temperature and partial pressures of the gaseous reactants and reaction products within the narrow ranges required. In accordance with the present invention, the ratio of $CO_2:CO$ in the main reduction stage is maintained below 100% but above about 20%, preferably at about 70–90% of the equilibrium ratio for the reduction of the metal oxide in the presence of CO and $CO_2$ at the temperature applied. For the reduction of FeO to Fe, this ratio, the exact values depending on the temperature, lies between about 0.1 and 0.6 for $CO_2:CO$ for a preferred temperature range of about 750–900° C. which permits both a practically operative rate of reduction and satisfactory fluidization. Slight reductions in these equilibrium ratios may be caused by impurities in a given ore. These deviations may be readily determined by conventional laboratory techniques.

It has been noted that as long as the mole ratio of gaseous oxygen to methane fed to the bottom of one of the reducing reactors is kept at a level not lower than 0.5, the tendency for serious carbon deposition on the metal is minimized. This may be explained by the assumption that as long as the ratio of oxygen atoms, as oxidizing gas, to carbon atoms in the hydrocarbon feed exceeds unity, the possibility of deposition of elementary carbon is negligible.

The relative and absolute amounts of hydrocarbon gases and air required to establish these conditions depend primarily on the scale of operation involved, the heat insulation of the reduction zone and the preheat of the ore and the air. Preheating the hydrocarbon gas to any temperature level approaching that required in the reduction zone is inadvisable because of cracking and plugging difficulties. Oxidic iron ores, for example, may be employed in particle sizes varying from less than 20 to 100 microns, up to about 10 mesh or larger, preferably in a wide size distribution, to be converted by the gases flowing upwardly through the reaction zone at linear velocities of about 0.3–5 ft. per second into dense, turbulent, fluidized masses having apparent densities of about 30–150 lbs. per cu. ft. Masses of this type may be successfully reduced in a reducing zone with conventional heat insulation by preheating the ore to temperatures preferably up to about 1200° C. and the air to about the same temperature, preferably in heat exchange with hot exit gases and supplying for example about 36,000 normal cu. ft. of methane and about 110,000 normal cu. ft. of air per ton of hematite ore to be reduced to about 90% to metallic iron. The amount of methane required in the second or clean-up stage both for reduction and heat generation is only a fraction, say about 10%, of that required in the first stage because less oxide remains to be reduced, the sensible heat absorbed by the ore in the first stage is available and less heat is required to maintain the limited endothermic clean-up reaction. However, care must be taken that a sufficient oxidizing potential is maintained to prevent the deposition of carbon which is strongly catalyzed by the iron in the complete absence of metal oxide. This oxidizing potential is readily maintained by keeping the methane:air ratio in the second stage at a properly low level to be determined for the temperature in question by the ratios given above. The absolute amount of gas supplied to the second stage may be about 20% of that supplied to the first stage. However, as previously stated, the clean-up zone is preferably operated with $H_2$ or with a mixture of $H_2$ and CO because (1) it reacts more rapidly (therefore allows greater capacity), (2) requires practically no external heat and (3) affords negligible risk of carbon deposition.

The two-stage process of the invention may be carried out in a single reaction zone in the form of a batch-type procedure. However, in accordance with the preferred embodiment of the invention, the process is conducted continuously, ore being charged to and reduced about 70–95% to metal in a first reduction zone, and the reduced ore being continuously charged to a second or clean-up zone wherein complete reduction to metal takes place. The fluid solids technique is preferably applied to both reduction zones. It is noted that by and large the higher the percentage of the gangue impurities in the ore which are unreducible under the conditions involved, the farther may the reduction of iron oxide to metal be carried without undue interference with fluidization.

When ores containing the higher oxides of iron are used, it may be desirable to subject the ores to a preliminary reduction approaching FeO, but not to Fe, prior to their introduction into the main reduction stage of the process of the invention. Off gases from the main reduction stage may be used as the reducing agent in such a preliminary reducing stage. Substantial savings in gas requirements may be secured in this manner. This type of operation is illustrated in Figure 3.

The nature of the present invention will be more readily apparent from the following description of the accompanying drawings in which:

Figure 1 is a semi-diagrammatic illustration of an apparatus suitable for the practice of the present invention; Figure 2 shows schematically a multi-zone reactor which may be used in a system of the type illustrated in Figure 1; and Figure 3 shows schematically another embodiment of the invention employing true countercurrent flow of the ore and methane in the reduction zone, and also illustrates a combination of the reduction process and a methane cracking process in which the latter is catalyzed by the iron product and supplies hydrogen for the reduction in the clean-up stage.

Referring now in detail to Figure 1, the system illustrated therein essentially consists of a primary reduction chamber 20 and a secondary reduction chamber 50 whose functions and cooperation will be explained forthwith using the reduction of an iron ore such as magnetite, hematite or the like with natural gas to metallic iron as an example. It should be understood, however, that the apparatus shown may be applied in a substantially analogous manner to the reduction of oxidic ores of other metals.

In operation, the finely divided iron ore containing the iron in a high state of oxidation and having a fluidizable particle size distribution between the range of about 50 microns and 20 mesh may be supplied by any conventional means to feed hopper 1 and thence through line 2 to a rotary kiln 3 wherein it may be preheated by hot combustion gases, as will appear more clearly hereinafter, to a temperature substantially above reduction temperature and even as high as 1200° C. The hot ore may enter a hopper 5 through line 4. Finely divided preheated iron ore is withdrawn from hopper 5 through line 7 which may have the form of an aerated standpipe, a screw conveyor or any other conventional means for conveying finely divided solids.

The iron ore may be passed from pipe 7 into gas feed line 12 wherein it is picked up by highly preheated air (up to about 1200° C.) to enter the bottom portion of reduction chamber 20. Natural gas and the remainder of the air requirement may be introduced separately or together through one, or preferably through several circumferentially arranged supply lines 13. The ore is converted in chamber 20 by the upwardly flowing gaseous reactants and reduction products into a dense, turbulent, fluidized mass resembling a boiling liquid having an upper level L. For this purpose, the dimensions of reduction chamber 20 are so chosen that substantial reduction of iron ore to metal during the residence time of the metal in reduction chamber 20 may be obtained at linear gas velocities within chamber 20 of, preferably, about 0.7 to 1.5 ft. per second to establish apparent phase densities within chamber 20 of about 70 to 125 lbs. per cu. ft. Lower phase densities may be applied. However, the solids should amount to at least 5% and preferably more than 10% by volume of the dense phase.

The natural gas is preferably preheated to a temperature below cracking temperature, say to about 200–300° C. in any conventional manner. Its amount is so controlled that an excess over that theoretically required for the reduction of the iron ore is available. This amount of methane serves to reduce about 90% of the iron ore to iron at a $CO_2$:CO ratio below but as close to the equilibrium ratio as practicable at the operating conditions, and in addition to furnish the heat requirement of the entire operation, i. e. the heat of reaction, sensible heat requirements of process materials, and heat loss through the equipment walls, by combustion with air at a $CO_2$:CO ratio as indicated above. About 25,000 to 40,000 normal cu. ft. of natural gas per ton of iron ore is adequate for this purpose, depending on the iron ore used.

Air supplied from compressor 17 is passed through line 19 through heat exchanger 21 in which it is preheated to a temperature of about 600° C. to 900° C., preferably in heat exchange with hot combustion gases produced as will appear hereinafter and supplied through line 23 to heat exchanger 21. The preheated air is passed through line 25 and manifold 26 to reduction chamber 20 as will be forthwith explained. The total amount of air fed through line 25 to reduction chamber 20 is so controlled that just enough oxygen is made available in reduction chamber 20 to maintain therein, in cooperation with the oxygen of the ore, an average temperature of about 750° C. to 900° C. by a limited combustion of the excess natural gas available in reduction chamber 20 at the $CO_2$:CO ratios above specified. About 2 to 4 normal cu. ft. of air per cu. ft. of methane supplied to reduction chamber 20 is sufficient for good operating conditions.

The contact between iron, methane and air in the bottom zone of reducing chamber 20 must be such that sufficient heat by methane combustion will be generated to support the reducing reaction. Simultaneously, the $CO_2$ concentration of the reducing atmosphere in the remainder of chamber 20 must be maintained below the equilibrium level at the temperature of reducing chamber 20 so as to prevent reoxidation of reduced iron metal. It is essential, therefore, to accomplish perfect mixing in the bottom zone of chamber 20 so as to concentrate substantially the entire combustion reaction in the bottom zone and to minimize the circulation of reduced metallic iron from higher zones to the bottom zone wherein a relatively high oxidation potential exists.

For this purpose the lower section of chamber 20 has, preferably, a conical shape with a rounded bottom as indicated in the drawing. The suspension of ore in natural gas supplied through line 12 and also, preferably, the air supplied through line 25 are forced into the conical bottom of chamber 20 in a tangential direction at relatively high linear velocities so as to create a violently whirling turbulence therein. The conical shape of the bottom section simultaneously causes the development of a strong vertical velocity component in an upward direction. This strong upward flow component substantially reduces or practically eliminates any downward circulation of reduced iron into the bottom combustion zone. Settling of ore in the bottom zone may be prevented by feeding at least a portion of the preheated air through line 26 to the lowest point of the bottom zone.

The reactions in this bottom zone are sufficiently rapid and violent to assure substantially complete decomposition, by the reduction and oxidation reactions occurring, of the methane entering the zone, with substantially no overall production of carbon from the cracking of methane. The impression is not to be taken that carbon is not produced during the cracking of methane. Experimental data indicate that the reaction mechanism involves the deposition of nascent carbon which under the conditions of the reaction disappears as rapidly as it is produced by reaction with $CO_2$ and $H_2O$ formed by the reduction of the ore. However, when the oxide content of the ore becomes too low $CO_2$ and $H_2O$ are not generated sufficiently rapidly to react with nascent carbon and overall production of carbon appears unless suitable steps are taken to prevent it. In this manner, the presence of sufficient oxygen in the form of air and metal oxide is assured in the zone of major methane decomposition to generate the heat required and to prevent the deposition of excessive amounts of carbon by cracking. The danger of excessive heat liberation and temperature rise in the burning zone is minimized by the fact that simultaneously reduction of iron ore takes place. The reaction is strongly endothermic and absorbs a substantial portion of the heat liberated. The clean-up of unconverted methane amounting to a minor proportion of the total natural gas fed takes place in the upper normally fluidized portions of chamber 20 at temperatures of about 750° C. to 900° C. at strongly reducing conditions.

A mixture of gaseous reactants comprising $CO_2$, $CO$, $H_2O$, $H_2$, $CH_4$, and $N_2$ in proportions varying within faily wide ranges depending mainly on the preheat of the charging materials, the insulation of, and the temperature maintained within reduction chamber 20 is withdrawn overhead from level L. At the conditions stated above, experimental data indicate that this gas mixture has a composition as follows (dry basis):

| | |
|---|---|
| $CO_2$ | 6.2 |
| $CO$ | 14.5 |
| $H_2$ | 29.2 |
| $CH_4$ | 1.9 |
| $N_2$ | 48.2 | when the temperature in chamber 20 is about 900° C.

The gases withdrawn from level L may be passed through a conventional gas-solids separator such as cyclone 42 or the like from which separated solid fines may be returned through pipe 44 to chamber 20 or discarded through line 45. Gas, substantially free of fines, leaves separator 42 through line 46 from which a portion may be branched off through line 47 to be used in preheating the ore in kiln 3 as follows. The gas in line 47 is mixed in burner 6 with air preheated in a conventional manner and supplied through line 8 to burner 6 in amounts adequate for substantially complete combustion of the gas supplied through line 47. The combustion gases produced in burner 6 preheat the ore in kiln 3 to the desired temperature in countercurrent flow and cold flue gas leaves kiln 3 through line 9. It is noted, however, that this method of ore preheating is suitable only for ores of a high state of oxidation because the combustion gases leaving burner 6 are strongly oxidizing toward ores of the FeO stage, such as siderite. Therefore, when ores of the latter type are employed, the sensible heat of the gases in line 46 is used without intermediate combustion to preheat the ore. In this case the addition of air through line 8 may be omitted or the off-gas may be supplied through line 47A directly to hopper 5.

Another portion of the off-gas in line 46 passes through line 48 to line 23 and heat exchanger 21 via a combustion zone 22 wherein its temperature is raised by combustion with air supplied through line 60. The hot gas leaving zone 22 through line 23 enters heat exchanger 21 wherein it preheats the process air as described above. After heat exchange, the gas is withdrawn from the system through line 62 to be used for any desired purpose. If the process is operated at elevated pressures of, say, above about 3 atmospheres it may be utilized in a waste gas turbine.

Reduced iron ore containing about 5–30% of the iron as oxide (FeO) and about 70–95% as powdered sponge iron is withdrawn through line 27 from an intermediate or upper section of chamber 20 under the pseudo-hydrostatic pressure of fluidized solids in chamber 20 and passed through line 32 to the bottom portion of a secondary reduction chamber 50. The supply of fluidized solids from chamber 20 to the bottom of chamber 50 may be readily accomplished by utilizing the pseudo-hydrostatic pressure on withdrawal pipe 27 as the propelling means and maintaining level L above level L–50. The flow of solids may be further simplified by aerating pipe 27 or maintaining the density of the fluidized mass within chamber 50 below that of the fluidized mass within chamber 20, all in a manner which will be readily understood by those skilled in the art of fluid solids handling.

Chamber 50 may be operated in a manner generally analogous to that described in connection with chamber 20. That is, the partially reduced iron ore is supplied through line 32 to the bottom of chamber 50 while methane and preheated air may be fed through branch lines 36 and 38 respectively to chamber 50, to form a dense turbulent, fluidized mass of solids therein having an upper level L–50. The absolute amounts of natural gas and air supplied are considerably smaller than those required in chamber 20 because of the smaller proportion of iron oxide present in chamber 50 and because of the high temperature at which the ore and metal are fed from chamber 20 to chamber 50. However, the ratio of air to methane is preferably substantially higher than that used in chamber 20 in order to establish an oxidation potential sufficient to prevent the deposition of carbon by cracking which may result from the catalytic activity of the metallic iron in the absence of appreciable amounts of iron oxide. It will be understood, however, that the $CO_2:CO$ ratio must still be kept below the equilibrium value necessary for the iron oxide reduction. It will also be appreciated that the heat losses in chamber 50 are nearly the same as those in chamber 20. Therefore, the total decrease of the methane requirement in chamber 50 as compared with that of chamber 20 will be preponderately at the expense of methane needed for ore reduction, while the percentage decrease of methane required for combustion will be considerably less significant. Usually 5000 to 8000 normal cu. ft. of natural gas per ton of fresh iron ore charged are sufficient to complete the reduction of the ore to metal in chamber 50.

The bottom portion of chamber 50 may be shaped and operated in a manner similar to that outlined in connection with chamber 20.

Gas withdrawn from level L-50 of chamber 50 has a composition only slightly different from that withdrawn from chamber 20. The reason for this is that unless the temperature is changed markedly, the composition must be kept approximately the same in order to maintain an adequate reduction potential for the metal and oxidation potential for the carbon. The gas withdrawn from level L-50 passes through gas-solids separator 66 provided with solids return line 68 and is added to line 48 through conduit 70, substantially at the temperature of chamber 50. The total amount of hot off-gas entering zone 22 from line 48 amounts to about 200,000 to 250,000 cu. ft. per ton of iron ore reduced.

Reduced iron ore, in the form of powdered sponge iron, is withdrawn under the pseudo-hydrostatic pressure of the dense fluidized mass of solids in chamber 50 through drawoff line 71 and fed to line 72 to be withdrawn from the system and passed to a melting furnace suitable for the processing of powdered sponge iron of the type here involved. Melting furnaces of the type described in the copending Gilliland application, Serial No. 751,760 filed June 2, 1947, now Patent 2,526,472, granted Oct. 17, 1950 and Graham applications, Serial No. 754,637 filed June 14, 1947, now Patent 2,517,557, granted Aug. 8, 1950, and Serial No. 18,390 filed April 1, 1948, all owned by applicant's assignee, now abandoned, are particularly adapted for this purpose.

It will be noted that the purpose of using a melting furnace for the product of the process of the invention is to make it possible to separate the gangue impurities of the ore from the metal produced by melting both of them, and separating the two liquids by gravity. The melting of the gangue may be facilitated by the use of conventional fluxes, e. g. limestone.

The embodiment of the invention described with reference to the drawing permits of various modifications. More than two reduction chambers of the type described may be used. For example, when it is desired to subject iron ores of a high state of oxidation to a preliminary reduction to FeO, this may be carried out by designing hopper 5 or an equivalent vessel as a suitable reducing zone and feeding hot off-gas from line 46 through line 47A to vessel 5. In this case the ore may be preheated in kiln 3 to any desired temperature as described above.

Screw conveyors or other mechanical means may substitute any or all of the pseudo-hydrostatic pressure conduits 7, 27, 71, etc. Instead of natural gas or methane, other hydrocarbon gases such as ethane, propane, refinery gases, coal carbonization gases, etc. may be used. The second reduction chamber may also be operated with CO and/or $H_2$ produced from methane or other carbonaceous material by reforming, oxidation, etc. carried out outside the reduction chamber. In this manner carbon deposition in the second stage ceases to be a problem. It is also noted that rotary kilns may be used in place of either or both reactors 20 and 50. Other modifications will occur to those skilled in the art without deviating from the spirit of the invention.

A further modification is schematically illustrated in Figure 2. As shown therein, the fluidized bed of reactor 20 is subdivided into several independent beds, two of which are shown at A and B. Ore may be supplied from pipe 7 through lines 7a and 7b while reducing gas and preheated air enter through refractory grids 6a and 6b from lines 12a and 12b. Spent reducing gas leaves through lines 46a and 46b and reduced ore through lines 27a and 27b. The operation of the individual zones A, B, etc. is analogous to that described above for reactors 20 and 50, both of which may be subdivided as indicated in Figure 2.

A similar arrangement of ore and gas supply with withdrawal as that shown for each zone A, B, etc. of Figure 2 may be used in single zone reactors, particularly those of relatively high capacity and therefore large diameter.

A further modification of the invention is illustrated in Figure 3 in which the process is illustrated with countercurrent flow of the oxidic ore and reducing gas. In the figure finely divided ore in a fluidized state is passed into a vertical elongated reduction zone 82. In order to provide for effective utilization of the reducing gas a countercurrent system is provided. For this purpose vessel 82 is equipped at intervals throughout the vessel with trays 83 provided with overflow levels or downcomers 84. The number of trays may be varied according to the capacity of the vessel and the extent of the reduction required. Fluidized materials entering the vessel through line 81 build up on the uppermost tray until the level L of the overflow is reached after which the fluidized ore passes downwardly in succession to the next lower level. The depth of the bed on each tray is preferably about 2 to 3 feet. The flow of fluidized ore occurs countercurrent to the upward flow of reducing gas and air entering the vessel through line 85. The flow rate of the latter gas is controlled so as not to interfere with the overall downward flow of the fluidized solids. This arrangement reduces back-mixing of ore particles in a vertical direction and permits withdrawal from the lower portions of the reduction zone of particles of the highest, rather than average degree of reduction. When so operating it is also desirable to feed at least a substantial portion of air to an intermediate and/or upper portion of the reduction zone, for example via line 105. In this manner a substantial portion or all of the heat to be generated within the reduction vessel 82 may be produced in the upper portions of the vessel while the ore is still in the oxide form so that an oxidizing atmosphere may be maintained to no disadvantage. The heat so generated is transferred as sensible heat of the ore to lower zones wherein reduction may be carried out with no generation of heat or only limited generation of heat by additional controlled combustion of the reducing gas in and to a reducing atmosphere.

The amount of reducing gas and air admitted to vessel 82 is controlled in the manner specified for the operation of the process of Figure 1. Spent reducing gases are removed from vessel 82 via line 86 after passing through cyclone 87 for removal of entrained solid material. The product consisting of 70-95% sponge iron and 5-30% iron oxide in the form of FeO is removed from the main reduction zone via line 88 and introduced into a clean-up zone 89. A portion of the iron product is removed from the product take-off line 88 and recycled via line 104 to the middle of the main reducing zone in quantities sufficient to maintain residual iron in the downflowing solids at the point of introduction. In the clean-up zone the iron oxide content of the product is converted to iron by means of hydrogen entering the zone via line 90. The hydrogen may be pure hydrogen or a mixture of hydrogen and CO. The use of hydrogen or hydrogen-containing gases in the clean-up zone is preferable, although as previously stated methane may be used at this point. Spent reducing gases are removed from the clean-up zone via line 91 while the iron product is removed from the clean-up zone via line 92. This product may be then sent to the melting furnace. When hydrogen is employed in the clean-up zone this material may be secured through the cracking of methane. In this event part of the iron product is removed via line 93 and introduced into cracking zone 94. Preheated methane is introduced into the cracking zone via line 95. The hydrogen produced during the cracking is removed via line 96 and introduced into the clean-up zone 89 via line 90. The solids product of the cracking operation, namely, metallic iron plus carbon, is removed from the cracking zone via line 97 and introduced into an upper point of the main reducing zone 82 via line 98 for the purpose aforesaid.

More preferably, however, this material is introduced into a preliminary reducing zone 100 via line 99 in the event that such a preliminary reducing zone is employed. When the process is applied to the reduction of the higher metallic oxidic ores a preliminary reducing zone may be profitably employed. When converting to metals the higher metallic oxides such as $Fe_2O_3$, it is sometimes advantageous to convert the $Fe_2O_3$ at least partly to FeO, but not to metallic Fe, in the preliminary reduction zone. When operating in this manner the crude $Fe_2O_3$ in a fluidized state is introduced into preliminary reducing zone 100 via line 101. The preliminary reducing zone is constructed in a manner similar to the main reducing zone 82. The flow of materials therein is likewise similar to vessel 82. The fluidized $Fe_2O_3$ travelling countercurrently downward through the vessel is reduced partly to FeO by means of a reducing gas entering the vessel at the bottom thereof via line 106. In this respect spent combustion gases from the main reducing zone can serve to bring about the necessary reduction of the oxide to its lower oxide, that is, the conversion of $Fe_2O_3$ to FeO. FeO is withdrawn from the preliminary reducing zone via line 102 and is then introduced via line 81 into vessel 82 where its reduction to metallic iron is completed in a manner similar to that previously indicated in the process of Figure 1 for the conversion of $Fe_2O_3$. When operating thus, line 104 should enter the top of vessel 82. In the main reducing zone the FeO will not be completely converted to Fe but the product will be a mixture containing 70–95% metallic iron and 5–30% FeO.

Instead of employing trays in towers 82 and 100 these vessels may be equipped with one or more zones of packing of coarse refractory bodies of non-fluidizable particle size, said zones being arranged at intervals over the length of the reduction zone. The packing may be composed of Raschig rings, Berl saddles or the like having a diameter of about 1 to 3 inches and consisting of clay, chamotte, ceramics or similar material. These packings permit an upward flow of the gases and downward passage of finely divided ore and simultaneously limit vertical back-mixing of fluidized solids across the height of the packing. The overall downward motion of the fluidized solids is accompanied by the continuous feed of solids to the top and continuous withdrawal of solids from the bottom of the reduction vessel as a result of the pseudo-hydrostatic pressure exerted by the fluidized mass. Depending on the linear velocity of the gases the unit may be so operated that the reduction vessel is filled with a substantially continuous fluidized mass having a single top level, or so that several fluidized beds are formed having individual levels between the packings.

While the foregoing description and exemplary operations have served to illustrate specific applications and results of my invention, other modifications obvious to those skilled in the art are within the scope of my invention. Only such limitations should be imposed on the invention as are indicated in the appended claims.

What is claimed is:

1. Process for reducing oxidic iron ore which comprises thoroughly mixing finely-divided unreduced oxidic iron ore in a reduction zone with a fluidized solids mass the solids content of which comprises 70 to 95 weight per cent Fe and 5 to 30 weight per cent of incompletely reduced oxidic ore, introducing into said reduction zone a hydrocarbon gas in stoichiometric excess with respect to the desired reduction of said ore, supplying a combustion-supporting gas to said reduction zone to generate by combustion with said excess hydrocarbon at least a portion of the heat required to maintain a temperature of 750° C. to 950° C. in said reduction zone, controlling the feed rate of hydrocarbon gas and combustion-supporting gas such that reduction of said oxidic iron ore takes place in said reduction zone while reoxidation of metallic iron and carbon deposition are substantially prevented, maintaining the solids in the reduction zone in a fluidized state by passage therethrough of gas introduced originally as hydrocarbon gas and combustion-supporting gas, maintaining 5 to 30 weight per cent of incompletely reduced oxidic ore in the fluidized mass in the reduction zone, withdrawing from said reduction zone Fe containing 5 to 30 weight per cent of incompletely reduced oxidic ore, and withdrawing gaseous products from said reduction zone.

2. The process of claim 1 in which back-mixing of reduced solids to said lower portion is limited by creating a marked upward velocity component of gases and solids in said lower portion.

3. The process of claim 1 in which a whirling turbulence is created in said lower portion by feeding at least a portion of said gases and solids to said lower portion at a high velocity in a tangential direction.

4. The process of claim 1 in which said withdrawn gaseous products are used to preheat said ore.

5. The process of claim 4 in which the temperature of said withdrawn gaseous products is increased by a further combustion with a combustion-supporting gas.

6. The process of claim 1 in which said reduction is carried out in at least two stages, and partly reduced fluidized ore is passed from stage to stage until the ore is substantially completely reduced.

7. The process of claim 6 in which the ratio of combustion-supporting gas to hydrocarbon gas is substantially smaller in the first of said stages than in subsequent stages.

8. The process of claim 6 in which the ore is subjected to a preliminary reduction to a lower oxide with gases withdrawn from one of said subsequent stages prior to the entry of said ore into one of said subsequent stages.

9. The process of claim 1 in which the ratio of gaseous oxygen, contained in said combustion-supporting gas, to said hydrocarbon gas supplied to said reduction zone, is at least 0.5.

10. The process of claim 1 in which said reduction zone is subdivided into a plurality of superimposed zones independent of each other with respect to gas and solids feed and withdrawal.

11. The process of claim 1 in which said reduction zone has a ratio of height to diameter of about 2–5 to 1.

12. A process for reducing $Fe_2O_3$ in a reduction zone with a fluidized solids mass the solids content of which comprises 70 to 95 weight per cent Fe and 5 to 30 weight per cent FeO, maintaining the solids in said reduction zone in a fluidized state by means of a reducing gas which enters the reduction zone as a hydrocarbon and in which a reduction temperature of 750° C. to 950° C. is maintained by burning a portion of said hydrocarbon gas in said reduction zone with a combustion-supporting gas, controlling the feed rate of hydrocarbon gas and combustion-supporting gas such that reduction of $Fe_2O_3$ to Fe and FeO takes place, maintaining 5 to 30 weight per cent of FeO in the fluidized mass in said reduction zone, and withdrawing Fe containing 5 to 30 weight per cent FeO from said reduction zone.

13. A process according to claim 12 in which the withdrawn mixture of Fe and 5 to 30 weight per cent of FeO is completely reduced to Fe in a second reduction zone with methane.

14. A process according to claim 12 in which the withdrawn mixture of Fe and 5 to 30 weight per cent FeO is completely reduced to Fe in a second reduction zone with a hydrogen-containing gas.

15. A process according to claim 12 in which the hydrogen-containing gas is produced by cracking methane in the presence of a portion of the metallic iron product as catalyst.

16. A process according to claim 12 in which the hydrocarbon gas is methane.

17. A process according to claim 16 in which the fluidized $Fe_2O_3$ and methane flow countercurrent to each other.

18. A process according to claim 12 in which the $Fe_2O_3$ is reduced at least in part to FeO but not to Fe in a preliminary reducing zone.

References Cited in the file of this patent

UNITED STATES PATENTS

| | | |
|---|---|---|
| 2,184,300 | Hodson et al. | Dec. 26, 1939 |
| 2,296,522 | Hartley | Sept. 22, 1942 |
| 2,343,780 | Lewis | Mar. 7, 1944 |
| 2,399,984 | Caldwell | May 7, 1946 |
| 2,481,217 | Hemminger | Sept. 6, 1949 |
| 2,481,226 | Krebs | Sept. 6, 1949 |

OTHER REFERENCES

Production of Sponge Iron, U. S. Dept. of Commerce, Bureau of Mines Bulletin 270. Published 1927. Pages 44–66 pertinent. Pages 45–46 relied upon.

Transactions of the American Institute of Mining and Metallurgical Engineers, Iron and Steel Division, 1946 (vol. 167). Pages 237–280, pertinent. Page 243 relied upon. Published by The Institute at the Office of the Secretary 29 W. 39th Street, New York 18, New York.